United States Patent [19]

Tibbetts

[11] 4,129,268

[45] Dec. 12, 1978

[54] ROCKETS INCLUDING TRAJECTORY CONTROLS

[75] Inventor: Willis F. Tibbetts, Reading, Mass.

[73] Assignee: Norris Industries, Inc., Los Angeles, Calif.

[21] Appl. No.: 503,838

[22] Filed: Oct. 23, 1965

[51] Int. Cl.$^2$ .............................................. F42B 13/30
[52] U.S. Cl. .................................................. 244/3.22
[58] Field of Search ...................... 244/3.1, 3.15, 3.21, 244/3.22; 102/49

[56] References Cited

U.S. PATENT DOCUMENTS

| | | | |
|---|---|---|---|
| 3,045,596 | 7/1962 | Rae | 244/3.22 |
| 3,180,223 | 4/1965 | Rambacher et al. | 244/3.21 |

Primary Examiner—Verlin R. Pendegrass

EXEMPLARY CLAIM

1. A rocket comprising a rear section including a motor, a forward war head section, an intermediate trajectory control section, and a rotatable connection between said control and motor sections, a gyroscope and a gas generator mounted within said control section, the generator ahead of the gyroscope, said gas generator including ignition means, a first nozzle operable to deliver a wheel-driving gas stream to the wheel of said gyroscope, and a second nozzle operable to deliver an upward thrust in assistance of the flight of said rocket, the thrust being applied approximately in the zone of the center of gravity of said rocket, means operable in response to a predetermined set-back force exerted on said rocket during its launch to engage and support said wheel against said force only during the existence of said force, gyroscope caging means, and means to release said caging means in response to the operation of said generator.

10 Claims, 5 Drawing Figures

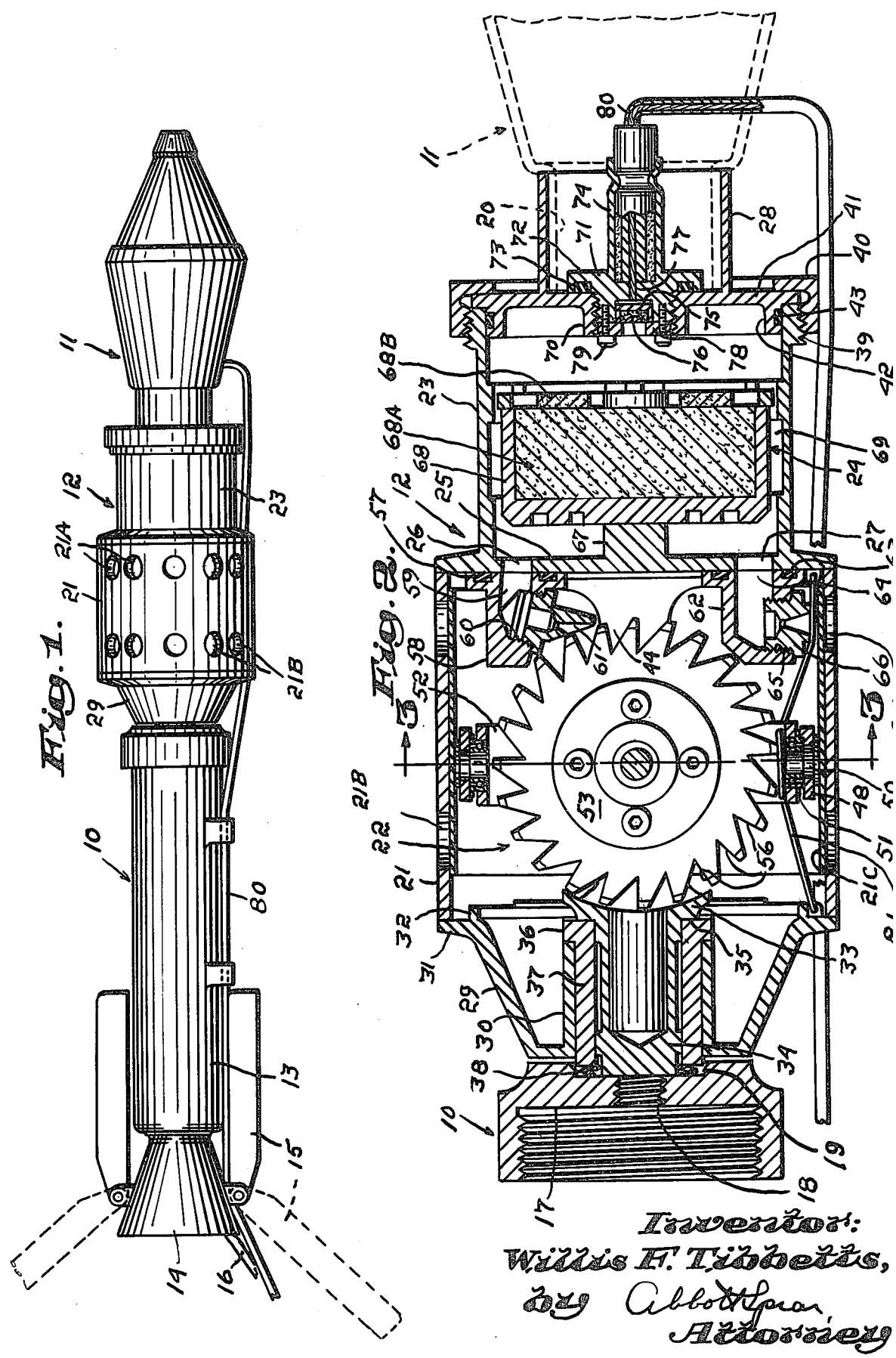

ROCKETS INCLUDING TRAJECTORY CONTROLS

The present invention relates to rockets provided with means to control their trajectory.

Rockets of the type that are manually sighted and particularly those launched from shoulder-supported launchers have the objectionable feature that their trajectory is not sufficiently flat to avoid misses due to incorrect range estimates even though the target is within range.

The principal objective of the invention is to provide means to increase the range of a rocket in which range estimates do not need to be made. In accordance with the invention, this objective is attained by providing a rocket having a rear motor section, a forward war head section, and an intermediate trajectory control section. A gyroscope and a gas generator are mounted within the control section and the generator has a first nozzle operable to deliver a driving gas jet to the wheel of the gyroscope and a second nozzle operable to deliver an upward, flight assisting jet in the zone of the center of gravity of the rocket.

In rockets of the above referred to type, the motor fuels burns up while the rocket is within its launcher and, of course, the set back forces are substantial. As a consequence, several problems exist and the solution of them are other objectives of the invention.

One problem is the necessity of supporting a gyroscope while set back forces of a predetermined magnitude exist in order to protect its bearings. In accordance with the invention, this objective is attained by providing the motor section with support for the control section to enable the control section to move rearwardly from a forward position against the action of a resilient member, the support engaging and supporting the wheel of the gyroscope while set back forces of that magnitude prevail. The support may also provide for relative rotation between the control and motor sections ensuring effective control by the gyroscope by avoiding roll torque on the control section.

While the ignition of the propulsion motor and the gas generator may take place simultaneously, it is desired that the gas generator remain in operation for a substantially longer time. The time required for the gas generator to come up to its operating pressure is important both because the full upward thrust is not available until it does; and in addition, until the gas generator is reasonably up to its operating pressure, the wheel of the gyroscope would not be driven at a high enough speed to resist roll.

In accordance with the invention, the gyroscope is caged until the wheel is driven at a reasonable speed and then is uncaged. This result is attained by the use of a fusible member or one that burns, such member connecting the gyroscope gimbal to the control section and exposed to the jet delivered by the second nozzle and burning at a rate ensuring a suitable delay in the uncaging of the gyroscope.

Another objective of the invention is the provision of a suitable fuel for the gas generator and its positive ignition. In order to secure the desired pressure-time relationship, the generator includes a first fuel that is long burning but relatively slow to ignite and a second fuel that is fast burning and relatively easy to ignite. The ignition means is in the form of a primer disposed towards the fuel and detonated by a fuze.

In the accompanying drawings, there are shown illustrative embodiments of the invention from which these and other of its objectives, novel features, and advantages will be readily apparent.

In the drawings:

FIG. 1 is a side elevation of a rocket in accordance with the invention,

FIG. 2 is a longitudinal section through the trajectory control section taken approximately along the indicated lines 2—2 of FIG. 1.

Figure 3:
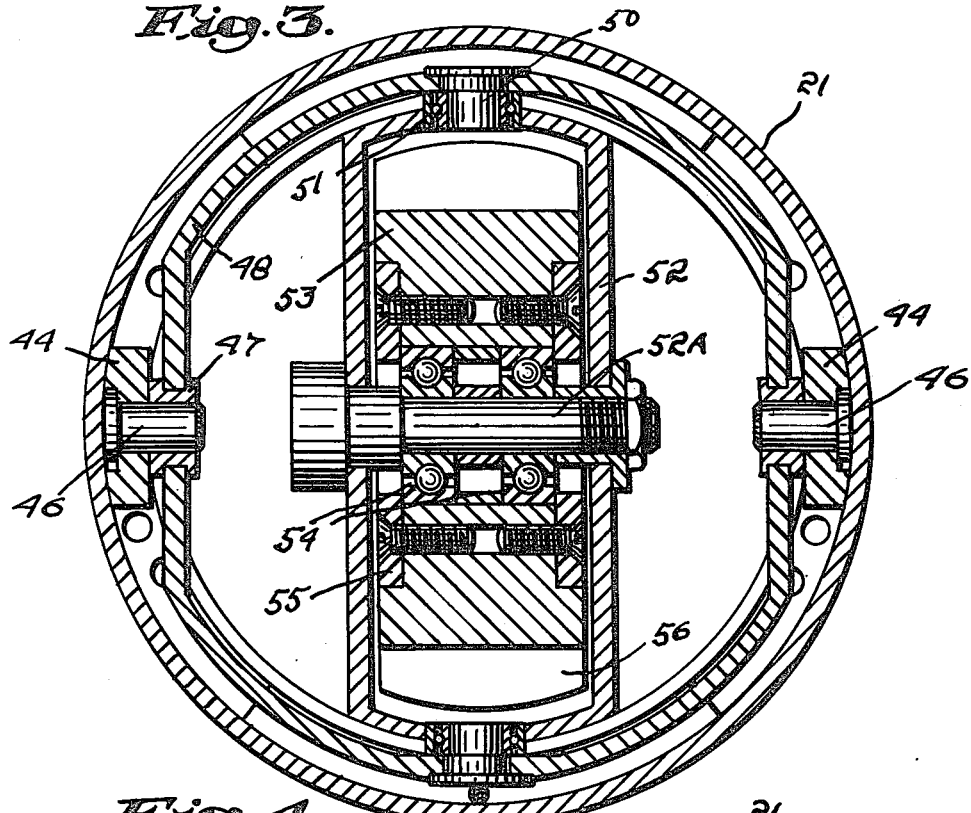
FIG. 3 is a section taken approximately along the indicated lines 3—3 of FIG. 2.
Figure 4:
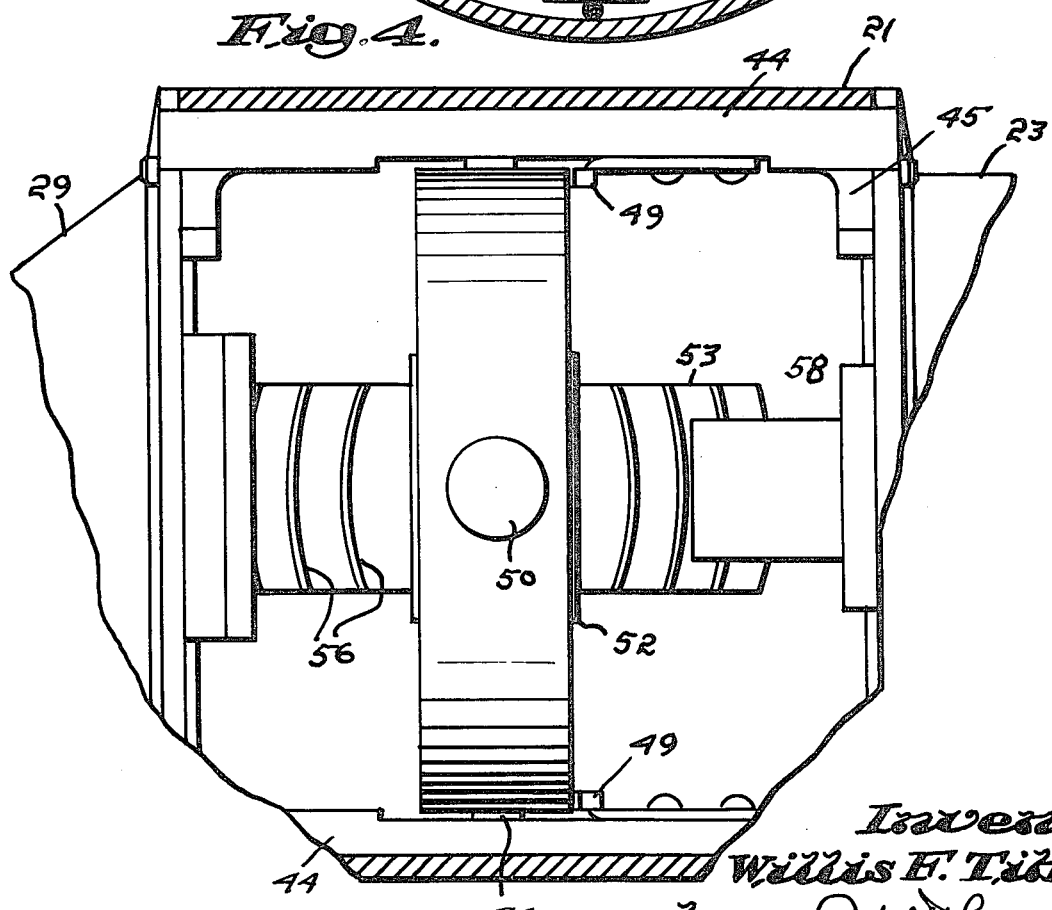
FIG. 4 is a fragmentary view of the trajectory control section with the upper part of its chamber broken away
Figure 5:
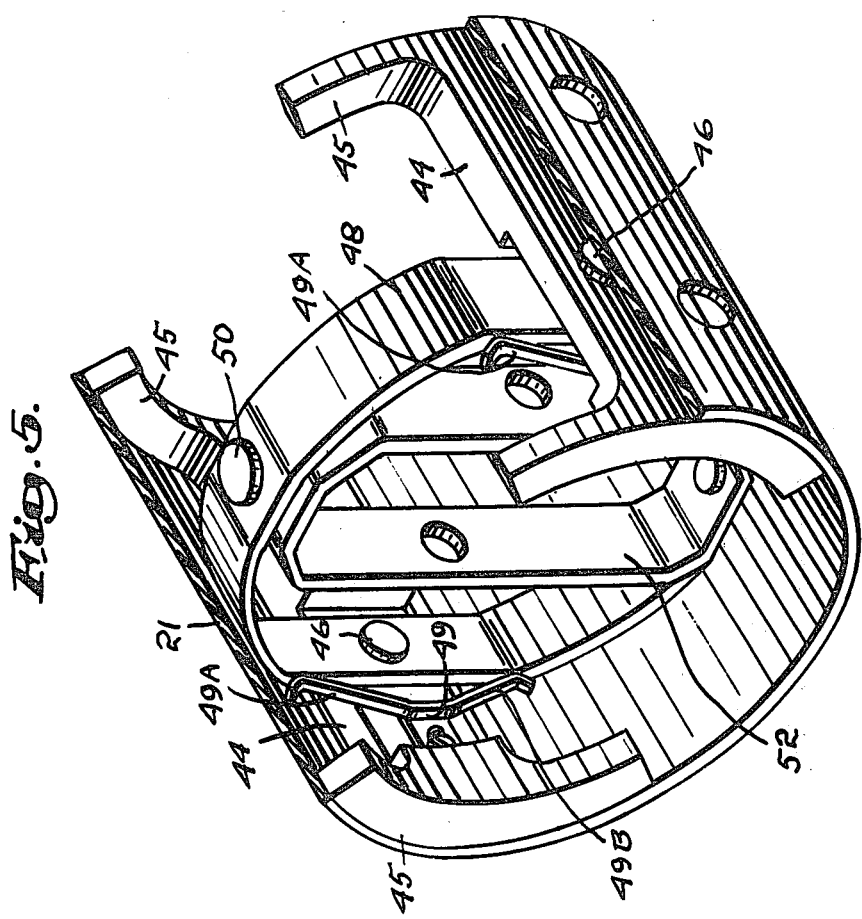
FIG. 5 is a perspective view of the gyroscope supporting framework.

The rocket illustrated by the drawings has, as may be seen in FIG. 1, a rear motor section generally indicated at 10, a forward war head section generally indicated at 11, and an intermediate trajectory control section generally indicated at 12.

The motor section 10 has a casing 13 having a rearwardly opening nozzle 14 to which spring-erected fins 15 are pivotably connected. The igniter is not shown but it may be of the type located in the nozzle 14 and provided with a fuze 16. At its forward end, the casing 13 has a wall 17 having a threaded, axial bore 18 opening centrally of a recess 19 in its front face. As the motor section 10 may be otherwise conventional, it will not be further detailed.

The war head section 11 is provided with a rearwardly opening, tubular, axial portion 20 of reduced diameter. As the details of the war head section 11 play no part of the present invention, it will not be further detailed.

The trajectory control section 12 consists of a rearward chamber 21 for the generally indicated gyroscope 22 and a forward chamber 23 of the generally indicated gas generator 24. The chambers 21 and 23 have a common wall 25 having ports 26 and 27 effecting interchamber communication. The diameter of the chamber 23 is slightly less than that of the chamber 21 and it has an axial forwardly opening sleeve 28 dimensioned to receive and secure the tubular portion 20 of the war head section.

The chamber 21 has a rearwardly and inwardly tapering end wall 29 having a hub 30 extending forwardly from its rear end and an outwardly disposed flange 31 at its forward end having an annular, forwardly disposed rib 32 adjacent its inner edge. A fixed support 33 has a stem 34 threaded into the bore 18 and having a forward outwardly projecting shoulder 35 confining a similarly projecting shoulder 36 of a bushing 37 against the free end of the hub 30 and holding the bushing 37 against the spring 38, shown as a wave-spring washer seated in the recess 19. With this construction, the chamber 21 is not only rotatably supported by the stem 34 of the support 33, and hence is rotatable relative to the motor section 10, but also it is movable a short distance rearwardly against the opposing action of the spring 33 from a forward position determined by the shoulder 35.

The gas generator chamber 23 is externally threaded as at 39 at its forward end to receive the nut 40 clamping the margin of the end wall 41 against the open end of the chamber 23. The wall 41 has an annular flange 42 fitting within the chamber 23 and carrying a seal 43 of the O-ring type. The sleeve 28 is on the end wall 41.

A pair of transversely alined frames 44, each including arcuate ends 45, are secured within the chamber 21 the flange 31 of the end wall 30 and to the wall 25. The frames 44 have diametrically alined, inwardly posed pivots 46 entrant of bushings 47 carried by the er, transverse gimbal 48 of the gyroscope 22. Springs one for each frame 44 are secured thereto forwardly the pivots 46 and include arms 49A and 49B engaging gimbal 48 on opposite sides of its pivot axis. The gimbal 48 is provided with diametrically alined, inwardly disposed pivots 50 with their axes intersecting axis of the pivots 46 at right angles. The pivots 50 end through ball bearing units 51 with which the er, longitudinal gimbal 52 is provided.

The inner gimbal 52 supports a shaft 52A, in the plane the pivots 46, on which the wheel 53 of the gyroscope 22 is supported by spaced ball bearing units 54 h the wheel 53 having bearing retainers 55. The wheel 53 has its periphery formed with a series of buckets 56.

Secured to the rear face of the wall 25 against an ring seal 57 is a mount 58 having a passage 59 in communication with the port 26. The mount 58 also has a passage 60 in communication with the passage 59 and headed to receive a nozzle 61 disposed to direct a jet inwardly against the periphery of the wheel 53 thereby to rotate it.

A mount 62 is also secured to the rear face of the wall against an O-ring 63 with its passage 64 in communication with the port 27. The mount passage 65 which ens into the passage 64 is threaded to receive a nozzle downwardly disposed to discharge a jet at right gles to the flight axis of the rocket. The chamber 21 is wn as having two longitudinally spaced series of uately spaced holes 21A and 21B with one hole 21A ng directly below the nozzle 66 to permit the jet to s downwardly therethrough, the series of holes 21A ng located approximately in the zone of the center of vity of the rocket. A rupturable liner 21C underlies holes 21A and 21B.

On the forward face of the wall 25 there is an axially ated boss 67 against which is seated the closed end of container 68 held centered by circumferentially ced, longitudinally disposed ribs 69 on the interior of gas generator chamber 23 and providing lengthwise sages between the space forwardly of the container and the space rearwardly thereof. The fuel in the ntainer 68 includes a fuel body 68A having, as comed to the rocket propelling fuel, a slower burning e. Such fuel is relatively difficult to ignite. For that son, on the surface of the fuel body 68A there are rium potassium ignition pellets 68B which burn rapy but are relatively easy to ignite.

The forward wall 41 is also provided with an interly threaded hub 70. A threaded holder 71 is threaded rwardly through the hub 70 and has a flange 72, led against the front face of the wall 41 by an O-ring 73, and a forwardly extending open ended tubular ket 74. The rear face of the holder 71 has a chamber for a primer 76 and in communication with the inter of the tube 74 via a vent 77. A primer-retaining ring is secured to the rear face of the hub 71 as by screws The ignition of the primer 76 is effected as by means the fuze 80 which is bottomed in the socket 74 outrdly through the wall of the tubular portion 20 of the r head and then rearwardly along the outer surface the gas generator chamber 23, through the chamber 21 and along the motor section 10 and joined to the motor fuze 16 to be ignited simultaneously therewith as by the trigger-controlled mechanism of the launcher as for example, that shown in U.S. Pat. No. 3,122,059.

With the rocket as thus described, it will be apparent that whenever the motor-igniting fuze 16 is ignited, the fuze 80 will also be ignited, the former igniting the motor fuel and the latter causing the primer 76 to explode to ignite the pellets 68B in the container which burn throughout the launch and ensure the ignition of the fuel 68A. The function of the gas generator 24 is to generate gas for the dual purpose of driving the wheel 53 of the gyroscope and providing a flight-assisting upward jet to "flatten" the trajectory of the rocket, and while it is desirable to have the flight-assisting jet effective on launch, the gyroscope must be caged until its wheel 53 is driven at a suitable speed.

The fixed support 33 has a seat 33A that is arcuate with respect to the wheel 53 and is engaged by and supports the wheel 53 when set-back forces are such as to effect the rearward movement of the chamber 21 relative to the motor section 10 against the opposition of the spring 38. While such set-back forces prevail, the gyroscope is positively supported and its bearings are protected against damage by the set-back forces. When the set-back forces subside the spring 38 is operative to unseat the wheel 53 enabling the gyroscope to become operative and the sections 10 and 11 are free to turn relative to one another.

The gyroscope is prevented from becoming effective, however, until the wheel 53 is driven at a suitable speed by a wire-like member 81 anchoring the outer gimbal 48 to the chamber 21 with one portion thereof traversing the nozzle 66. The member 81 is of the type that burns such as a bimetallic composition known as "Pyrofuse", and is ignited by the jet through the nozzle 66. As the rate of burning of the member 81 is predetermined, its length determines the interval at the end of which the gyroscope will be freed in relation to the operation of the gas generator 24.

I claim:

1. A rocket comprising a rear section including a motor, a forward war head section, an intermediate trajectory control section, and a rotatable connection between said control and motor sections, a gyroscope and a gas generator mounted within said control section, the generator ahead of the gyroscope, said gas generator including ignition means, a first nozzle operable to deliver a wheel-driving gas stream to the wheel of said gyroscope, and a second nozzle operable to deliver an upward thrust in assistance of the flight of said rocket, the thrust being applied approximately in the zone of the center of gravity of said rocket, means operable in response to a predetermined set-back force exerted on said rocket during its launch to engage and support said wheel against said force only during the existence of said force, gyroscope caging means, and means to release said caging means in response to the operation of said generator.

2. The rocket of claim 1 in which the rotatable connection between the motor and control sections consists of a spindle fixed axially to the motor section and including the wheel engaging and supporting means, the control section includes a sleeve rotatably supported by the spindle for axial movement relative thereto between forward and rearward positions, a resilient member yieldably maintaining the sleeve in said forward position, the wheel engaging and supporting means being engaged by the gyroscope wheel on predetermined movement of the sleeve toward its rearward position.

3. The rocket of claim 1 in which the gas generator includes a fuel supply operable for a substantially longer interval than the rocket motor.

4. The rocket of claim 1 in which the gas generator includes a first fuel supply in the form of a relatively slow burning solid fuel that is relatively hard to ignite and a second fuel supply in the form of relatively fast burning fuel that is relatively easy to ignite, and the ignition means are operative to ignite the second fuel supply.

5. The rocket of claim 1 in which the generator includes a forwardly opening fuel container, the ignition means is spaced forwardly of and disposed rearwardly towards the container, and there is an annular passway effecting communication between the space between the container and the ignition means and the nozzles.

6. The rocket of claim 1 in which the generator includes a forwardly opening fuel container and the ignition means includes a rearwardly opening axial seat, a primer-like detonator is in the seat, a retainer marginally engages the primer and holding it seated, a fuze extends inwardly into the generator, an axial sleeve connects the fuze to the generator, and an axial vent effects communication between the interior of the sleeve and the interior of the seat.

7. The rocket of claim 1 in which the control section includes forward and rearward chambers, a common wall between the chambers, the gas generator being within the forward chamber, the gyroscope within the rearward chamber, the nozzles are carried by the common wall and are within the rearward chamber, and the common wall has ports, one for each nozzle and placing it in communication with the interior of the forward chamber.

8. The rocket of claim 1 in which both nozzles are downwardly disposed, the first located above the second and the control section has ports, one located in the path of a jet through the second nozzle.

9. The rocket of claim 1 in which the means to release the caging means is operated in a predetermined delayed relationship to the ignition of the gas generator.

10. The rocket of claim 1 in which the caging means is a member connecting a gyroscope gimbals to the control section and extends in the path of a jet through the second nozzle, the member being of a material ignitable by that jet and burning at a predetermined linear rate.

* * * * *